A. MIDDLETON.
Coupling Link for Railroad Cars.

No. 229,731.  Patented July 6, 1880.

WITNESSES
P. M. Dumer.
Henry Howson Jr.

INVENTOR
Allen Middleton
by his Attorneys
Howson and Son

UNITED STATES PATENT OFFICE.

ALLEN MIDDLETON, OF PHILADELPHIA, PENNSYLVANIA.

COUPLING-LINK FOR RAILROAD-CARS.

SPECIFICATION forming part of Letters Patent No. 229,731, dated July 6, 1880.

Application filed February 19, 1880.

*To all whom it may concern:*

Be it known that I, ALLEN MIDDLETON, a citizen of the United States, residing in Philadelphia, Pennsylvania, have invented an Improved Coupling-Link for Railroad-Cars, of which the following is a specification.

My invention consists of a weldless coupling-link of steel, the ends of the said link being re-enforced in thickness and the grain of the metal being straight throughout, as described hereinafter, the link being more economical in construction, and more durable than ordinary bent and welded coupling-links of wrought-iron.

Figure 1:
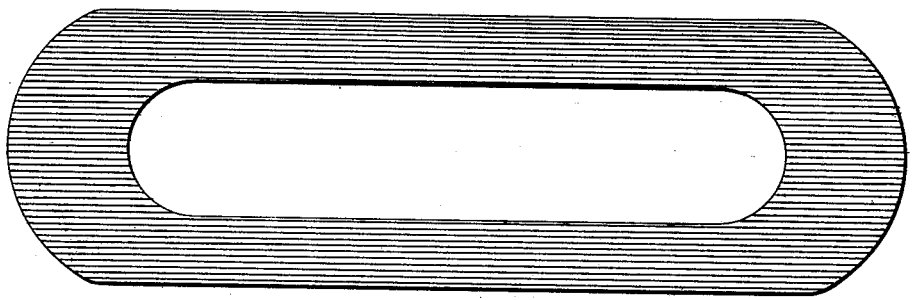
Figure 2:
Figure 3:
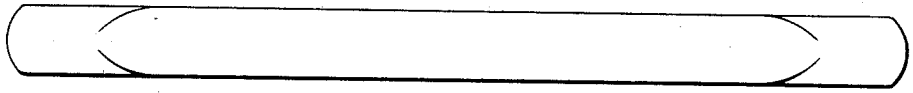

In the accompanying drawings, Figure 1 is a plan view of my improved coupling-link for railroad-cars; Fig. 2, an edge view; Fig. 3, the same, showing the edge of the link rounded, and Fig. 4 a view illustrating the mode of making the link.

An ordinary car-link is made by bending a bar of wrought-iron to the desired shape and welding the ends together.

It is well known that links of this class are frequently broken, the fractures being due in part to the bending of the metal, and that they are soon worn away at the ends, where they are in severe frictional contact with the coupling-pins. As a remedy for the latter difficulty, it has been proposed to re-enforce the ends of the links by making them thicker, and therefore more lasting—a plan carried out by making enlargements at proper points on the bar before bending and welding the same, as shown in the English Patent No 5,672 of 1828.

Bessemer steel and other steel of analogous character, being much more durable than wrought-iron and much stronger under tension, would be applicable to the manufacture of substantial links in the ordinary way but for the difficulty of making a proper weld of that metal.

Figure 4:
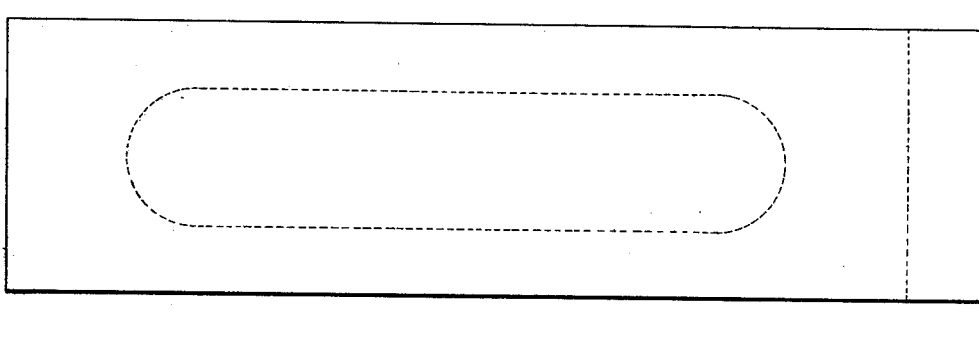

My improved link is made without welding from a solid bar of steel, preferably Bessemer steel, the eye shown by dotted lines in Fig. 4 being cut or punched out by suitable tools and machinery while] the steel is hot, but not too hot to impair the metal. After this operation the link may be rounded at each end, as shown in Fig. 1, and may, if desired, be rounded by swaging, as shown in Fig. 3; but this is not essential to my invention.

It will be seen that the grain of the metal is straight throughout and parallel with the sides of the link, as indicated by the parallel lines in Fig. 1; but any weakness at the ends, which may be due to this direction of the grain, is counteracted by the toughness of the metal compared with wrought-iron and by the extra thickness of the metal at the ends.

Bessemer steel of a quality adapted to the manufacture of the improved links is as cheap as, or even cheaper than, the charcoal wrought-iron, of which the best of ordinary links should be made, and the improved link can be manufactured much more rapidly than the common link by suitable appliances, as no tedious bending and welding operations are required. Hence, the improved link is at the same time both more economical to make and more durable than ordinary wrought-iron links.

I claim as my invention and as a new manufacture—

A weldless link of steel the ends of which are re-enforced in thickness and in which the grain of the metal is straight throughout, as set forth.

In testimony whereof I have signed my name to this specification in the presence of two subscribing witnesses.

ALLEN MIDDLETON.

Witnesses:
JAMES F. TOBIN,
HARRY SMITH.